Feb. 24, 1931. U. A. WHITAKER 1,793,573
VARIABLE LOAD BRAKE
Filed Oct. 12, 1929
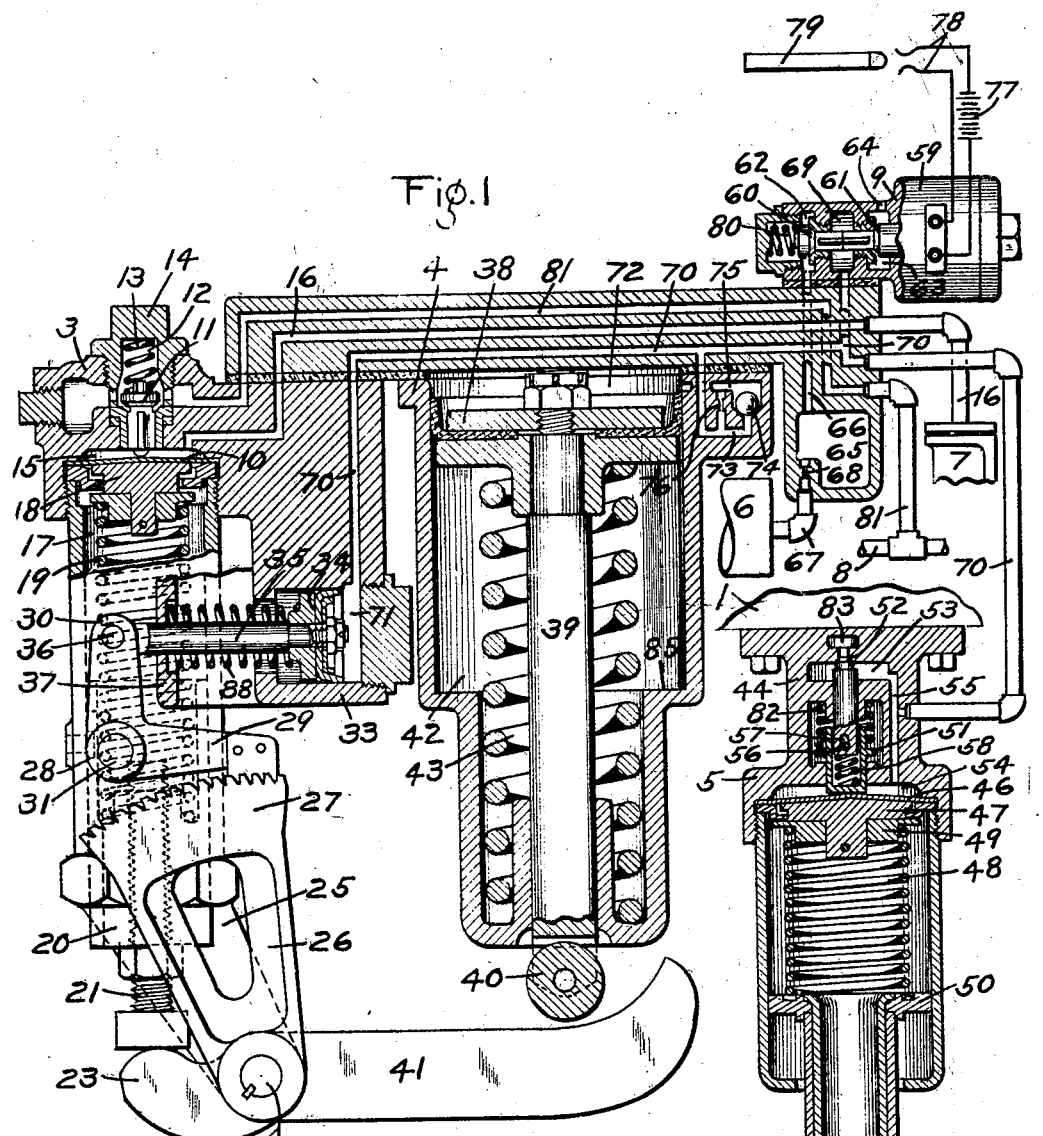
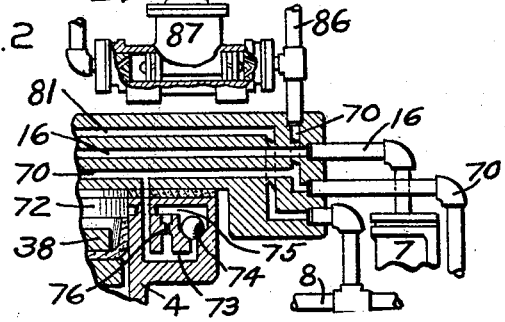
INVENTOR
UNCAS A. WHITAKER
BY Wm. M. Cady
ATTORNEY Patented Feb. 24, 1931

1,793,573

UNITED STATES PATENT OFFICE

UNCAS A. WHITAKER, OF CANTON, OHIO, ASSIGNOR TO THE WESTINGHOUSE AIR BRAKE COMPANY, OF WILMERDING, PENNSYLVANIA, A CORPORATION OF PENNSYLVANIA

VARIABLE-LOAD BRAKE

Application filed October 12, 1929. Serial No. 399,155.

This invention relates to fluid pressure brakes for vehicles, and more particularly to a brake apparatus adapted to vary the braking power according to the load on the car.

The principal object of my invention is to provide an improved vehicle variable load brake apparatus having means operative upon opening a door of the vehicle for varying the maximum pressure of fluid obtainable in the brake cylinder according to the load carried.

Another object of my invention is to provide an improved vehicle variable load brake apparatus having means adjustable according to the load on the vehicle and operative upon the opening of the vehicle door for controlling the maximum pressure of fluid obtainable in the brake cylinder.

A further object of my invention is to provide an improved vehicle variable load brake apparatus having pressure sensitive means interposed between the body and a truck of the vehicle adjustable according to the load on the car and operative upon the opening of a door of the vehicle for controlling the maximum pressure of fluid obtainable in the brake cylinder.

Other objects and advantages will appear in the following more detailed description of the invention.

In the accompanying drawing, Fig. 1 is a diagrammatic view, mainly in section, of a variable load brake apparatus embodying my invention; Fig. 2 is a diagrammatic view of a portion of the apparatus illustrating a modification of the invention.

In the drawing, the reference character 1 indicates a vehicle body which is supported on the usual vehicle truck not shown, 2 the upper member or cover plate of the truck bolster, which constitutes a part of the vehicle truck, 3 a brake cylinder pressure limiting valve device, 4 an adjusting piston device, 5 a control valve device, 6 a main reservoir, 7 a brake cylinder, 8 an application pipe, which in the present embodiment is a straight air pipe, and 9 a magnet valve device.

The brake cylinder pressure limiting valve device may comprise a casing having a flexible diaphragm 10 mounted therein adapted to control the operation of a valve 11 contained in a valve chamber 12. Also contained in the chamber 12 is a spring 13 which is interposed between a cap nut 14, having screw threaded connection with the casing, and the upper side of the valve 11, which spring tends to seat the valve 11.

The chamber 15 at one side of the flexible diaphragm 10 is constantly connected to the brake cylinder 7 through a passage and pipe 16. Contained in a chamber 17 at the other side of the diaphragm 10 is a follower 18, which is subject to the pressure of an adjustable spring 19, said spring being adjusted by means of a plunger 20 which is slidably mounted in the lower end portion of the casing, and which is in engagement with the lower end of the spring 19.

Having screw threaded connection with the plunger body and extending therebelow is a bolt 21, and head 22 of which, is adapted to be engaged by an arm 23 which is secured to a shaft 24, rotatably mounted in a bracket 25, which may be integral with the casing of the brake cylinder pressure limiting valve device 3.

Also secured to the shaft 24, is an arm 26 which, at its free end, is provided with a toothed segment 27.

Located above the arm 26, is a pawl 28 which, in the present embodiment of the invention, is in the form of a bell crank having arms 29 and 30 and which is mounted to rock on a projection 31 preferably integral with the casing of the limiting valve device 3. The arm 29 is provided with teeth adapted to engage the teeth of the segment 27 to lock the arm 26 in an adjusted position, as will be hereinafter more fully described.

For the purpose of operating the pawl 28 so as to move the teeth on the arm 29 into and out of locking engagement with the teeth of the segment 27, a pawl operating piston device 33 is provided.

This piston device 33 may comprise a casing containing a piston 34 having a stem 35 which, at its outer end, is operatively connected with the arm 30 of the pawl through the medium of a pin 36. Surrounding the piston stem 35, and interposed between and engaging the piston 34 and a bracket 37, which may be integral with the casing, is a spring 88, the pressure of which tends to maintain the piston in its normal right hand position and the pawl in locking engagement with the segment 27 as shown in Fig. 1.

The adjusting piston device 4 may comprise a casing containing a piston 38 having a stem 39 which projects through the end of the casing and which, at its outer end, is provided with a roller 40 adapted to engage a lever 41 secured to the shaft 24, which lever is for the purpose of operating the shaft. Contained in the chamber 42 at one side of the piston 38 is a spring 43 which tends to maintain the piston in its normal position as shown in the drawing.

The control valve device 5 may comprise telescoping parts 44 and 45, the part 44 being secured to the vehicle body 1 and the part 45 being secured to the truck bolster 2 or to any other desired part of the truck.

Mounted in the part 44 is a flexible diaphragm 46, the underside of which is engaged by a follower 47, subject to the pressure of a spring 48 through the medium of a spring seat 49, the lower end of the spring seating on a spring seat 50 secured to the upper end of the part 45. Engaging the upperside of the flexible diaphragm 46, is a plunger 51 which is subject to the pressure of a coil spring 82, which plunger is loosely connected with a discharge valve 52 contained in a valve chamber 53 constantly connected with a diaphragm chamber 54 at one side of the diaphragm 46 through a passage 55.

The loose connection between the stem of the valve 52 and the plunger 51 is made by passing a pin 56 through the plunger and through a slot 57 formed in the stem and anchoring the ends of the pin to the plunger. Interposed between the lower end of the valve stem and the plunger, is a spring 58 which tends to maintain the valve 52 seated and the valve stem, at the lower end of the slot 57, in engagement with the pin 56, so that when the plunger 51 moves downwardly, such movement will be immediately transmitted to the valve stem and cause the valve 52 to be unseated. It will be noted that by the use of this loose connection, the plunger 51 is permitted to move upwardly relative to the valve stem, so that when the valve 52 is seated, upward movement of the diaphragm, due to track conditions, cannot be directly transmitted to the valve, thus guarding the valve and its seat against damage.

The magnet valve device 9 may comprise a magnet 59 which is adapted to control the operation of valves 60 and 61 contained in chambers 62 and 63 respectively. The valve chamber 63 is connected to the atmosphere through a passage 64 and the valve chamber 62 is constantly connected with a volume reservoir 65 through a passage 66, said volume reservoir being constantly connected to the main reservoir 6 through a pipe 67 and a restricted passage 68. Between the valve chambers 62 and 63, there is a chamber 69 which is constantly connected to the valve chamber 53 and diaphragm chamber 54 of the control valve device 5 through a passage and pipe 70 and passage 55, and to a piston chamber 71 at one side of the piston 34 of the pawl operating piston device 33 through the passage 70. The piston chamber 72 at one side of the piston 38 is also connected to the chamber 69 through a branch pipe 73, past a ball check valve 74 and a passage 75, the passages 73 and 75 in advance of the ball check valve 74 being also connected through a restricted passage 76.

The coil of the magnet 59 is connected in a circuit including a source of current 77 and including a switch 78 which is controlled by the opening and closing of a door 79 of the vehicle, so that when the door is open, the magnet circuit will be closed and when the door is closed, the circuit will be opened.

In operation, when the car is running along the road, with the car door 79 in closed position, as shown in full lines, the magnet circuit will be open and the magnet 59 will be deenergized. With the magnet valve 59 deenergized, the pressure of a spring 80 contained in the valve chamber 62 will maintain the valve 60 seated and the valve 61 unseated.

With the valve 60 seated, flow of fluid under pressure from the main reservoir 6 and volume reservoir 65 to the chamber 69 is closed off, and with the valve 61 unseated, the piston chambers 71 and 72 of the pawl operating piston device and adjusting piston device, respectively, valve chamber 53 and diaphragm chamber 54 are connected to the atmosphere. With these chambers thus connected to the atmosphere, and the vehicle empty, the several parts of the mechanism will be in their normal positions as shown in the drawing, so that the brake cylinder 7 will be connected to the atmosphere by way of pipe and passage 16, diaphragm chamber 15, in the brake cylinder pressure limiting valve device 3, past the unseated valve 11, through valve chamber 12 and a passage and pipe 81 and pipe 8, and through the usual brake valve device, (not shown).

To bring the vehicle to a stop, it is the usual practice to first operate the brake valve device to application position to effect a full service application of the brakes and then as the speed of the vehicle is reduced, operate the brake valve device to reduce the pressure of fluid in the brake cylinder and then as the vehicle comes to a stop, operate the brake valve device to lap position to maintain sufficient pressure in the brake cylinder to hold the brakes applied.

In effecting an application of the brakes, fluid under pressure is supplied to the brake cylinder by way of pipe 8, pipe and passage 81, valve chamber 12 past the unseated valve 11, diaphragm chamber 15 and passage and pipe 16. Now, when the car comes to a stop, and one of the doors is moved to open position, the magnet circuit will be closed, and the magnet 59 energized. With the magnet 59 thus energized, the valve 61 will be seated and the valve 60 unseated. With the valve 60 unseated, fluid under pressure flows to the chamber 69 of the magnet valve device from the volume reservoir 65 by way of passage 66, valve chamber 62 and past the unseated valve 60. From the chamber 69 fluid under pressure is supplied to the valve chamber 53 and diaphragm chamber 54 of the control valve device 5, by way of passage and pipe 70 and passage 55, and to the piston chamber 71 of the pawl operating piston device 33 by way of passage 70.

From the passage 70, fluid under pressure flows to the piston chamber 72 of the adjusting piston device 4 by way of branch passage 73 past the ball check valve 74 and passage 75.

Now, with the vehicle empty, the pressure of fluid supplied to the diaphragm chamber 54, in the control valve device 5, will move downwardly against the pressure of the spring 48, and permit the pressure of the spring 82 to move the plunger 51 downwardly and unseat the valve 52.

With the valve 52 thus unseated, further build up of pressure in the piston chambers 71 and 72 will be prevented, by the venting of the fluid under pressure, supplied from the main reservoir 6 through the choke passage 68, volume reservoir 65, passage 66 and through the magnet valve device 9, to the atmosphere past the unseated valve 52 and through a passage 83.

The flow area of the restricted passage 68 is such, that when the valve 52 of the control valve device is unseated, the rate of flow of fluid under pressure, from the main reservoir 6, to the atmosphere, will not be excessive. It will be noted that when the valve 60 of the magnet valve device 9 is unseated, the piston chambers 71 and 72, as well as the diaphragm chamber 54 are charged rapidly from the reservoir 65, after which, the build up of pressure in these chambers is slow, due to the restricted flow through the passage 68.

When fluid under pressure is supplied to the piston chamber 72, the piston 38 moves downwardly, and when fluid under pressure is supplied to the piston chamber 71, the piston 34 operates against the pressure of the spring 88, to rotate the pawl 28 about the lug 31, thus moving the teeth of the arm 29 out of locking engagement with the teeth of the segment 27. The piston 38 will move downwardly against the pressure of the spring 43 until the roller mounted on the stem 36 thereof engages the upper surface of the arm 41, at which time, the valve 52 of the control valve device will be unseated, so that there will be no further build up of pressure in the piston chamber 72 and the downward movement of the piston 38 will come to a stop without having operated the lever 41.

Now, if there has been no load added to the vehicle, and the door 79 is moved to its closed position, the electric circuit through the magnet 59 will be open and the magnet deenergized. When the magnet is thus deenergized, the pressure of the spring 80 contained in the valve chamber 62 of the magnet valve device operates the valve 60 to its seated position, and the valve 61 to its unseated position. With the valve 61 unseated, the piston chamber 71 will be vented to the atmosphere by way of passage 70, chamber 69 in the magnet valve device, past the unseated valve 61, through chamber 63, and passage 64. In the same manner, fluid under pressure from the diaphragm chamber 54 of the control valve device 5 will be vented to the atmosphere. Upon thus venting the chamber 71, the pressure of the spring 88 causes the pawl 28 to operate in such a manner that the teeth of the arm 29 thereof will lockingly engage the teeth of the segment 27 on the arm 26.

Upon the venting of the chamber 54 of the control valve device, the pressure of the spring 48 will flex the diaphragm 46 upwardly, causing the plunger 51 to be operated upwardly against the pressure of the spring 82, and as this plunger is so moved, the pressure of a spring 58 will seat the valve 52.

The pressure of fluid is vented from the piston chamber 72 at a restricted rate through the passage 75, restricted passage 76, passage 73, and thence to the atmosphere through passage 70 and the magnet valve device 9. It will here be noted that the piston chamber 71 is vented to the atmosphere at an unrestricted rate, while the piston chamber 72 is vented to the atmosphere at a restricted rate, and this is for the purpose of insuring the teeth of the arm 29 being in locking engagement with the teeth of the segment 27 before the piston 38 is operated out of engagement with the arm 41, so that the pressure of the spring 19 cannot change the adjustment of the lever.

When, in effecting a full service application of the brakes, the brake cylinder pressure present in the diaphragm chamber 15 in the pressure limiting valve device 3, acting on one side of the flexible diaphragm 10, is sufficient to overcome the pressure of the spring 19, acting on the other side, said diaphragm will flex downwardly permitting the pressure of the spring 13 to seat the valve 11 to close off the further supply of fluid under pressure to the brake cylinder and thus limit the brake cylinder pressure. The initial compression or adjustment of the spring 19 determines the maximum brake cylinder pressure obtainable on any empty vehicle.

If, when the door is open, a load is added to the vehicle, the vehicle body 1 will move downwardly relative to the truck, and in so doing, compresses the spring 48, thus increasing its pressure on the diaphragm 46. The diaphragm now operates upwardly, causing the valve 52 to be seated, so that the pressure of fluid in the diaphragm chamber 54, as well as in the piston chamber 72 of the adjusting piston device 4, is increased. As the pressure of fluid in the chamber 72 is thus increased, the piston 38, stem 39 and roller 40 will be operated downwardly against the pressure of the spring 43, causing the arm 41 to be operated to rotate the shaft 24 in a clockwise direction. As the shaft is thus rotated, the arm 23 secured thereto will be moved upwardly, operating the plunger 20 upwardly, compressing the spring 19, thus increasing the pressure of the spring acting on the diaphragm 10.

Now, when the pressure of fluid in the diaphragm chamber 54 in the control valve device slightly exceeds the adjusted pressure of the spring 48, the diaphragm 46 is flexed downwardly permitting the discharge valve 52 to be again unseated, thus preventing the further build up of pressure in the adjusting piston chamber 72 and in the control valve diaphragm chamber 54. Since the further build up in pressure of fluid in the piston chamber 72 is not permitted, the pressure of the spring 43 causes the downward movement of the piston 38 and the adjustment of the pressure regulating spring 19 to cease.

Now, when the vehicle door 79 is closed, the magnet circuit is opened, causing the deenergization of the magnet 59. Upon the deenergization of the magnet, the pressure of the spring 80 operates the pressure supply valve 60 to its seated position, closing off the further supply of fluid to the piston chamber 71 in the pawl operating piston device 33, the adjusting piston chamber 72, and to the diaphragm chamber 54 in the control valve device, and further operates the discharge valve 61 to its unseated position, venting these chambers 71, 72 and 54 to the atmosphere by way of passage 70, chamber 69 in the magnet valve device, past the unseated valve 61, through valve chamber 63 and passage 64.

Since the piston chamber 71 is vented to the atmosphere at a much faster rate than the pressure of fluid in the adjusting piston chamber 72 can be vented by way of the restricted passage 76, the pressure of the spring 88 will cause the pawl operating piston 34 to move to its right hand position, rocking the pawl 28 on the lug 31 a sufficient distance that the teeth on the pawl arm 29 engage the teeth of the segment 27, of the arm 26 secured to the shaft 24, before the pressure of the piston 38 is removed from the operating arm 41.

With the teeth of the pawl arm 29 thus in engagement with the teeth of the segment 27, the arm 26 will be locked in adjusted position against the downward pressure of the spring 19 acting through the plunger 20, bolt 21, arm 23 and shaft 24, thus maintaining the spring 19 adjusted.

The brakes may now be released in the usual manner by operating the brake valve device to release position.

If a full service application of the brakes is effected after the apparatus has thus been adjusted, the brake cylinder pressure which it is possible to obtain will be greater than that which can be obtained when the apparatus is adjusted for an empty vehicle due to the increase in the pressure of the spring 19.

From the foregoing description it will be seen that, since the pawl 28 is operated out of locking engagement with the arm 26 each time the door is opened, the apparatus will be automatically adjusted as the load on the vehicle is being increased and decreased.

When the vehicle door 79 is open and the vehicle fully loaded, the control valve device will be so adjusted, by the downward movement of the vehicle body relative to the truck, that the pressure of fluid will build up sufficiently in the adjusting piston chamber 72 to cause the piston 38 to move outwardly and come to a stop against an annular shoulder 85 formed interiorly of the casing of the adjusting piston device 4. When the piston engages the shoulder 85, the maximum adjustment of the spring 19 of the brake cylinder pressure limiting device will have been made so that in effecting a service application of the brakes the maximum brake cylinder pressure is obtainable.

Should the load on the vehicle be reduced when the door 79 is open, the control valve device will operate to reduce the pressure of fluid in the adjusting piston chamber 72 and the pressure of the spring 43 will move the piston 38 upwardly until the pressure on both sides thereof are substantially equal when it will come to a stop. As the piston thus moves upwardly, the pressure of the spring 19 of the brake cylinder pressure limiting valve device, through the medium of the plunger 20, bolt 21, arm 23 and shaft 24, causes the arm 41 to remain in engagment with the roller 40 so that when the piston 38 comes to a stop the adjustment of the spring 19 will cease. Now, when the door is closed the pawl 28 will be operated into locking engagement with the arm 26 and thus maintain the pressure limiting valve device adjusted.

In the present embodiment of the invention, the upper surface of the arm 41, which is adapted to be engaged by the roller 40 of the adjusting piston device 4, is curved upwardly so that when the arm is operated by the piston device, the adjustment of the pressure of the spring 19 of the pressure limiting valve device 3 will, at all times, be such that the maximum pressure obtainable in the brake cylinder will be directly proportional to the load carried on the vehicle. It will, however, be understood that, where it is not desired to have the brake cylinder pressure, at all times, directly proportional to the load carried, the upper surface of the lever, instead of being curved upwardly, may be made straight or any other desired shape.

In Fig. 2 a modification of the invention is illustrated which differs from the apparatus illustrated in Fig. 1, in that, the magnet valve device 9 and the several elements of the electric circuit associated therewith and the vehicle door 79, and the reservoir 65 are all omitted and fluid under pressure, for controlling the operation of the apparatus, is supplied through a door opening pipe 86 leading to the door opening side of a door engine 87 and also to the passage and pipe 70.

Fluid under pressure, when supplied to the door opening pipe 86, flows to the door opening side of the door engine, causing said engine to operate to open the door and also flows through the passage 70 to the pawl operating piston chamber 71, the adjusting piston chamber 72 and control diaphragm chamber 54, and with these chambers thus supplied with fluid under pressure, the operations of this apparatus will be substantially the same as those described in connection with the apparatus shown in Fig. 1.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a variable load brake apparatus for a vehicle, the combination with means adjustable by fluid under pressure for varying the braking power, of a door for the vehicle, and means operative upon the opening of said door and according to the load on the vehicle for varying the pressure of fluid on said adjustable means.

2. In a variable load brake apparatus for a vehicle, the combination with means adjustable by fluid under pressure for varying the braking power, of a door for the vehicle, and means operative according to the load on the vehicle when the door is open for varying the pressure of fluid on said adjustable means.

3. In a variable load brake apparatus for a vehicle, the combination with means adjustable by fluid under pressure for varying the braking power, of a door for the vehicle, and means operative according to the load on the vehicle when the door is open for varying the pressure of fluid on said adjustable means and operative upon the closing of said door for causing said mechanism to be locked in its adjusted position.

4. In a variable load brake apparatus for a vehicle, the combination with means adjustable by fluid under pressure for varying the braking power, of a door for the vehicle, means operative according to the load on the vehicle when the door is open for varying the pressure of fluid on said adjustable means, and means operative upon the closing of said door for maintaining said adjustable means in adjusted position.

5. In a variable load brake apparatus for a vehicle, the combination with mechanism adjustable by fluid under pressure for varying the braking power, of a door for the vehicle, means operative according to the load on the vehicle when the door is open for varying the pressure of fluid on said adjustable means, and means operative upon the closing of said door for locking said mechanism in adjusted position and operative upon the opening of said door for unlocking said mechanism.

6. In a variable load brake apparatus for a vehicle, the combination with mechanism adjustable by fluid under pressure for varying the braking power, of a door for the vehicle, means operative upon the opening of said door for supplying fluid under pressure to said mechanism, and means operative according to the load on the vehicle for varying the pressure fluid in said mechanism.

7. In a variable load brake apparatus for a vehicle, the combination with mechanism adjustable by fluid under pressure for varying the braking power, of a door for the vehicle, means operative upon the opening of said door for supplying fluid under pressure to said mechanism, and operative upon the closing of said door for releasing fluid under pressure from said mechanism, and means operative when the door is open and the load on the vehicle reduced for releasing fluid under pressure from said mechanism.

8. In a variable load brake apparatus for a vehicle, the combination with mechanism adjustable by fluid under pressure for varying the braking power, of a door for the vehicle, electro-responsive means operative upon the opening of said door for supplying fluid under pressure to said mechanism, and means operative according to the load on the vehicle for varying the pressure of fluid in said mechanism.

9. In a variable load brake apparatus for a vehicle, the combination with mechanism adjustable by fluid under pressure for varying the braking power, of a door for the vehicle, means operative upon the opening of said door for supplying fluid under pressure to said mechanism, and pressure sensitive means operative for controlling the pressure of fluid in said mechanism according to the load on the vehicle.

10. In a variable load brake apparatus for a vehicle, the combination with mechanism adjustable by fluid under pressure for varying the braking power, of electro-responsive valve means operative to supply fluid under pressure to said mechanism, and a valve device operative to control the pressure of fluid in said mechanism according to the load on the vehicle.

11. In a variable load brake apparatus for a vehicle, the combination with mechanism adjustable by fluid under pressure for varying the braking power, of electro-responsive means operative to supply fluid under pressure to said mechanism, and a valve device operative to reduce the pressure of fluid in said mechanism when the load on the vehicle is reduced and to cause the pressure of fluid in said mechanism to be increased when the load on the vehicle is increased.

12. In a variable load brake apparatus for a vehicle, the combination with mechanism adjustable by fluid under pressure for varying the braking power, of electro-responsive means operative to supply fluid under pressure to said mechanism, and a valve device operative to cause the pressure of fluid in said mechanism to be increased and decreased as the load on the car is increased and decreased.

13. In a variable load brake apparatus for a vehicle, the combination with a variable load mechanism adapted to be operated by fluid under pressure, of a door for the vehicle, means operative upon the opening of said door for supplying fluid under pressure to said mechanism, and means operative according to the load on the vehicle for controlling the pressure of fluid in said mechanism.

14. In a variable load brake apparatus for a vehicle, the combination with a brake cylinder, of adjustable valve means for controlling the supply of fluid under pressure to the brake cylinder, a movable abutment for adjusting said valve means, a lever operative to control the operation of said abutment, a piston subject to the pressure of fluid for operating said lever, a door for the vehicle, means operative upon the opening of said door for subjecting said piston to the pressure of fluid, and means operated according to the load on the vehicle for controlling the pressure of fluid on said piston.

15. In a variable load brake apparatus for a vehicle, the combination with a brake cylinder, of adjustable valve means for controlling the supply of fluid under pressure to the brake cylinder, a piston device subject to fluid under pressure for adjusting said valve means, a valve device operative to supply fluid under pressure to said piston device, and valve means operative according to the load on the vehicle for controlling the pressure of fluid in said piston device.

16. In a variable load brake apparatus for a vehicle, the combination with a brake cylinder, of adjustable valve means for controlling the supply of fluid under pressure to the brake cylinder, a piston device subject to fluid under pressure for adjusting said valve means, a valve device operative to supply fluid under pressure to said piston device, and valve means operative upon movement of the body of the vehicle relative to a truck of the vehicle for controlling the pressure of fluid in said valve device.

17. In a variable load brake apparatus for a vehicle, the combination with a brake cylinder, of adjustable valve means for controlling the supply of fluid under pressure to the brake cylinder, a piston device subject to fluid under pressure for adjusting said valve means, a valve device operative to supply fluid under pressure to said piston device, and valve means interposed between the body and truck of the vehicle operative according to the load on the vehicle body for controlling the pressure of fluid in said piston device.

18. In a variable load brake apparatus for a vehicle, the combination with a brake cylinder, of a valve device adjustable according to the load on the vehicle for limiting the supply of fluid under pressure to the brake cylinder, lever means operative to adjust said valve device, a pawl operative into and out of locking engagement with said lever means, pressure sensitive means for operating said pawl, piston means for controlling the operation of said lever means, valve means for supplying fluid under pressure to said pressure sensitive means for operating said pawl out of locking engagement with said lever means and for supplying fluid under pressure to said piston device, and means operative according to the load on the vehicle for controlling the pressure of fluid in the piston device and thereby the operation of said piston device.

19. In a variable load brake apparatus for a vehicle, the combination with a brake cylinder, of a valve device adjustable according to the load on the vehicle for limiting the supply of fluid under pressure to the brake cylinder, lever means operative to adjust said valve device, said means comprising a lever having a curved surface, and fluid pressure controlled means for controlling the operation of said lever means, said fluid pressure controlled means cooperating with said curved surface for adjusting said valve device directly proportional to the movement of said fluid pressure controlled means.

20. In a variable load brake apparatus for a vehicle, the combination with a brake cylinder, of a valve device adjustable according to the load on the vehicle for limiting the supply of fluid under pressure to the brake cylinder, lever means operative to adjust said valve device, said means comprising a lever having a curved portion, and fluid pressure controlled means cooperating with the curved portion of said lever to adjust said valve device directly proportional to the movement of the fluid pressure controlled means.

21. In a variable load brake apparatus for a vehicle, the combination with a brake cylinder, of a valve device adjustable according to the load on the vehicle for limiting the supply of fluid under pressure to the brake cylinder, lever means operative to adjust said valve device, said means comprising a lever movable in the arc of a circle, pressure sensitive means for operating said lever and movable tangentially to the path of travel of said lever, and means on said lever with which said pressure sensitive means cooperates to cause said lever to operate to adjust said valve device directly proportional to the movement of said pressure sensitive means.

22. In a variable load brake apparatus for a vehicle, the combination with a brake cylinder, of a valve device adjustable according to the load on the vehicle for limiting the supply of fluid under pressure to the brake cylinder, lever means operative to adjust said valve device, said means comprising a lever movable in the arc of a circle about a fixed point and having a curved end portion, and pressure sensitive means for controlling the operation of said lever movable tangentially to the path of travel of the lever and cooperating with the curved end portion thereof for adjusting said valve device directly proportional to the movement of said pressure sensitive means.

23. In a variable load brake apparatus for a vehicle, the combination with means adjustable according to the load on the vehicle for regulating the braking power, of a locking device for locking said means in an adjusted position and released by fluid under pressure, a door for the vehicle, and means operative upon the opening of said door for supplying fluid under pressure to said locking device.

24. In a variable load brake apparatus for a vehicle, the combination with means adjustable according to the load on the vehicle for regulating the braking power, of a locking device for locking said means in an adjusted position and released by fluid under pressure, a door for the vehicle, means operative upon the opening of said door for supplying fluid under pressure to said locking device and operative upon the closing of said door to release fluid under pressure from said locking device, and means for returning said locking device to locking position when fluid under pressure is released therefrom.

25. In a variable load brake apparatus for a vehicle, the combination with means adjustable according to the load on the vehicle for regulating the braking power, of a locking device for locking said means in an adjusted position and released by fluid under pressure, a door for the vehicle, and electro-responsive means controlled by the operation of said door for supplying fluid under pressure to said locking device.

26. In a variable load brake apparatus for a vehicle, the combination with means adjustable according to the load on the vehicle for regulating the braking power, of a locking device for locking said means in an adjusted position and released by fluid under pressure, a door for the vehicle, and means controlled by the operation of said door for supplying and releasing fluid under pressure to and from said locking device.

27. In a variable load brake apparatus, the combination with a brake cylinder, of an adjustable valve device operative to limit the pressure of fluid supplied to the brake cylinder, lever means operative to adjust said valve device, a fluid pressure controlled device for controlling the operation of said lever means, a locking device engaging said lever means for locking said valve device in adjusted position, a piston device operative by fluid under pressure for releasing said locking device, and means for supplying fluid under pressure to said fluid pressure controlled device and piston device.

28. In a variable load brake apparatus, the combination with a brake cylinder, of an adjustable valve device operative to limit the pressure of fluid supplied to the brake cylinder, lever means operative to adjust said valve device, a fluid pressure controlled device for controlling the operation of said lever means, a locking device engaging said lever means for locking said valve device in adjusted position, a piston device operative by fluid under pressure for releasing said locking device, and operative to return said locking device into locking engagement with said lever means upon the release of fluid under pressure from the piston device, means for supplying and releasing fluid under pressure to and from said fluid pressure controlled device and piston device, and means for retarding the release of fluid under pressure from said fluid pressure controlled device.

29. In a variable load brake apparatus, the combination with a brake cylinder, of an adjustable valve device operative to limit the pressure of fluid supplied to the brake cylinder, lever means operative to adjust said valve device, a fluid pressure controlled device for controlling the operation of said lever means, a locking device engaging said lever means for locking said valve device in adjusted position, a piston device operative by fluid under pressure for releasing said locking device, and operative to return said locking device into locking engagement with said lever means upon the release of fluid under pressure from the piston device, means for supplying and releasing fluid under pressure to and from said fluid pressure controlled device and piston device, and means whereby the flow of fluid released from said fluid pressure controlled device will be at a slower rate than that from said piston device.

30. In a variable load brake apparatus, the combination with a brake cylinder, of an adjustable valve device operative to limit the pressure of fluid supplied to the brake cylinder, lever means operative to adjust said valve device, a fluid pressure controlled device for controlling the operation of said lever means, a locking device engaging said lever means for locking said valve device in adjusted position, a piston device operative by fluid under pressure for releasing said locking device, means for supplying a predetermined amount of fluid under pressure to said piston device and fluid pressure controlled device at an unrestricted rate, the pressure of fluid thus supplied being sufficient to operate said piston device only, and means for increasing the pressure of fluid in said fluid pressure controlled device at a stricted rate after the unrestricted flow of fluid under pressure has ceased.

31. In a variable load brake apparatus, the combination with a brake cylinder, of an adjustable valve device operative to limit the pressure of fluid supplied to the brake cylinder, lever means operative to adjust said valve device, a fluid pressure controlled device for controlling the operation of said lever means, a locking device engaging said lever means for locking said valve device in adjusted position, a piston device operative by fluid under pressure for releasing said locking device, two connected reservoirs normally charged with fluid under pressure, means operative to establish communication through which fluid under pressure is supplied from both of said reservoirs to said piston device and fluid pressure controlled device, the flow of fluid from one of said reservoirs being at an unrestricted rate and of a pressure sufficient to operate said piston device only, and means for restricting the flow of fluid under pressure from the other of said reservoirs.

32. In a variable load brake apparatus, the combination with a brake cylinder, of an adjustable valve device operative to limit the pressure of fluid supplied to the brake cylinder, lever means operative to adjust said valve device, a fluid pressure controlled device for controlling the operation of said lever means, a locking device engaging said lever means for locking said valve device in adjusted position, a piston device operative by fluid under pressure for releasing said locking device, two connected reservoirs normally charged with fluid under pressure, means operative to establish communication through which fluid under pressure is supplied from both of said reservoirs to said piston device and fluid pressure controlled device, the flow of fluid from one of said reservoirs being at an unrestricted rate and of a pressure sufficient to operate said piston device only, and means for retarding the build up of pressure in said fluid pressure controlled device from the other of said reservoirs.

33. In a variable load brake apparatus, the combination with a brake cylinder, of an adjustable valve device operative to limit the pressure of fluid supplied to the brake cylinder, lever means operative to adjust said valve device, a fluid pressure controlled device for controlling the operation of said lever means, a locking device engaging said lever means for locking said valve device in adjusted position, a piston device operative by fluid under pressure for releasing said locking device, two connected reservoirs normally charged with fluid under pressure, means operative to establish communication through which fluid under pressure is supplied from both of said reservoirs to said piston device and fluid pressure controlled device, the flow of fluid from one of said reservoirs being at an unrestricted rate and of pressure sufficient to operate said piston device only, and means for restricting the flow of fluid under pressure from the other of said reservoirs to delay the operation of said fluid pressure controlled device.

In testimony whereof I have hereunto set my hand, this 9th day of October, 1929.

UNCAS A. WHITAKER.